United States Patent
Yasuda

(10) Patent No.: US 8,655,151 B2
(45) Date of Patent: Feb. 18, 2014

(54) EDITING APPARATUS, EDITING METHOD, PROGRAM, AND RECORDING MEDIA

(75) Inventor: Hiroyuki Yasuda, Saitama (JP)

(73) Assignee: Sony Corporation, Tokyo (JP)

( * ) Notice: Subject to any disclaimer, the term of this patent is extended or adjusted under 35 U.S.C. 154(b) by 146 days.

(21) Appl. No.: 13/273,773

(22) Filed: Oct. 14, 2011

(65) Prior Publication Data

US 2012/0099842 A1 Apr. 26, 2012

(30) Foreign Application Priority Data

Oct. 25, 2010 (JP) ................. P2010-238170

(51) Int. Cl.
*H04N 5/76* (2006.01)

(52) U.S. Cl.
USPC ......................................... 386/278

(58) Field of Classification Search
USPC ......................................... 386/278
See application file for complete search history.

(56) References Cited

U.S. PATENT DOCUMENTS

| 6,728,406 B1* | 4/2004 | Murao | 382/191 |
| 2006/0193000 A1* | 8/2006 | Enomoto | 358/1.15 |
| 2011/0026901 A1* | 2/2011 | Kashima | 386/282 |

FOREIGN PATENT DOCUMENTS

JP 2009-153144 A 7/2009

* cited by examiner

*Primary Examiner* — Thai Tran
*Assistant Examiner* — William Tran
(74) *Attorney, Agent, or Firm* — Sony Corporation

(57) ABSTRACT

An editing apparatus is disclosed. A story determination block determines a story expressed by a time function and provides a reference for selecting an image from among candidate images. An evaluation value computation block computes an evaluation value for each of the candidate images for each selection time in the story based on the story determined by the story determination block and at least one feature value indicative of a feature of each of candidate images set to each thereof. An image selection block selects an image for each selection time from among the candidate images based on the computed evaluation value. An editing processing block links selection images that are images selected by the image selection block for each selection time to each other in a time-dependent manner.

19 Claims, 9 Drawing Sheets

FIG. 2

| IMAGE | TIME (c1) | PLACE (c2) | IMAGE ANGLE (c3) | PORTRAIT DEGREE (c4) | MOTION DEGREE (c5) |
|---|---|---|---|---|---|
| m1 | 1 | 1 | 1 | 1 | 2 |
| m2 | 1 | 2 | 2 | 3 | 7 |
| m3 | 2 | 2 | 2 | 1 | 4 |
| m4 | 2 | 3 | 6 | 9 | 3 |
| m5 | 2 | 3 | 6 | 7 | 5 |
| m6 | 3 | 5 | 6 | 7 | 9 |
| m7 | 3 | 5 | 5 | 9 | 8 |
| m8 | 4 | 6 | 8 | 7 | 3 |
| m9 | 4 | 6 | 8 | 10 | 4 |
| m10 | 6 | 9 | 4 | 5 | 7 |
| m11 | 6 | 9 | 6 | 7 | 3 |
| m12 | 9 | 10 | 9 | 10 | 9 |
| m13 | 10 | 10 | 10 | 8 | 2 |
| m14 | 10 | 3 | 2 | 2 | 1 |

FIG. 5

| SELECT TIME t | 0 | 1 | 2 | 3 | 4 | 5 | 6 | 7 | 8 | 9 |
|---|---|---|---|---|---|---|---|---|---|---|
| m1 | 5.5 | 1 | 3.5 | 8 | 12.5 | 17 | 21.5 | 26 | 30.5 | 35 |
| m2 | 14.5 | 10 | 6.5 | 7 | 9.5 | 12 | 14.5 | 17 | 21.5 | 26 |
| m3 | 10 | 5.5 | 3 | 5.5 | 8 | 12.5 | 17 | 21.5 | 26 | 30.5 |
| m4 | 22 | 17.5 | 13 | 9.5 | 10 | 10.5 | 11 | 13.5 | 16 | 18.5 |
| m5 | 22 | 17.5 | 13 | 9.5 | 8 | 6.5 | 7 | 9.5 | 14 | 18.5 |
| m6 | 28.5 | 24 | 19.5 | 15 | 11.5 | 8 | 6.5 | 7 | 9.5 | 12 |
| m7 | 28.5 | 24 | 19.5 | 15 | 11.5 | 8 | 8.5 | 9 | 9.5 | 12 |
| m8 | 25 | 20.5 | 16 | 11.5 | 9 | 7.5 | 8 | 8.5 | 11 | 15.5 |
| m9 | 29 | 24.5 | 20 | 15.5 | 11 | 9.5 | 10 | 10.5 | 11 | 13.5 |
| m10 | 28 | 23.5 | 19 | 14.5 | 10 | 7.5 | 7 | 7.5 | 10 | 12.5 |
| m11 | 28 | 23.5 | 19 | 14.5 | 12 | 9.5 | 7 | 7.5 | 10 | 12.5 |
| m12 | 42.5 | 38 | 33.5 | 29 | 24.5 | 20 | 15.5 | 11 | 6.5 | 2 |
| m13 | 35 | 30.5 | 26 | 23.5 | 21 | 18.5 | 16 | 13.5 | 11 | 10.5 |
| m14 | 13 | 8.5 | 6 | 7.5 | 11 | 14.5 | 18 | 21.5 | 25 | 28.5 |
| SELECTED IMAGE | m1 | m1 | m3 | m3 | m3 | m5 | m6 | m6 | m12 | m12 |

A: m1–m14 rows  
B: SELECTED IMAGE row

FIG. 6

| SELECT TIME t | 0 | 1 | 2 | 3 | 4 | 5 | 6 | 7 | 8 | 9 |
|---|---|---|---|---|---|---|---|---|---|---|
| m1 | 5.5 | | | | | | | | | |
| m2 | 14.5 | 10 | 6.5 | 7 | | | | | | |
| m3 | 10 | 5.5 | | | | | | | | |
| m4 | 22 | 17.5 | 13 | 9.5 | 10 | 10.5 | 11 | 13.5 | 16 | 18.5 |
| m5 | 22 | 17.5 | 13 | 9.5 | 8 | | | | | |
| m6 | 28.5 | 24 | 19.5 | 15 | 11.5 | 8 | 6.5 | | | |
| m7 | 28.5 | 24 | 19.5 | 15 | 11.5 | 8 | 8.5 | 9 | 9.5 | 12 |
| m8 | 25 | 20.5 | 16 | 11.5 | 9 | 7.5 | 10 | 10.5 | 11 | 13.5 |
| m9 | 29 | 24.5 | 20 | 15.5 | 11 | 9.5 | 7 | 7.5 | 10 | 12.5 |
| m10 | 28 | 23.5 | 19 | 14.5 | 10 | 7.5 | 7 | 7.5 | 6.5 | 10.5 |
| m11 | 28 | 23.5 | 19 | 14.5 | 12 | 9.5 | 15.5 | 11 | 11 | |
| m12 | 42.5 | 38 | 33.5 | 29 | 24.5 | 20 | 16 | 13.5 | | |
| m13 | 35 | 30.5 | 26 | 23.5 | 21 | 18.5 | | | | |
| m14 | 13 | 8.5 | 6 | | | | | | | |
| SELECTED IMAGE | m1 | m3 | m14 | m2 | m5 | m8 | m6 | m10 | m12 | m13 |

C

D

EDITING APPARATUS, EDITING METHOD, PROGRAM, AND RECORDING MEDIA

CROSS-REFERENCE TO RELATED APPLICATION

The present application claims priority from Japanese Patent Application Nb. JP 2010-238170 filed in the Japanese Patent. Office on Oct. 25, 2010, the entire content of which is incorporated herein by reference.

BACKGROUND

The present disclosure relates to an editing apparatus, an editing method, a program, and a recording media.

Recently, the remarkable advances in the processing performance of computers, such as PCs (Personal Computers) for example allow the editing of images (moving images and still images) in a practical processing time without using specially dedicated apparatuses. In addition, this trend has constantly increased the number of users of image editing apparatuses for personal and household use. Image editing requires various tasks, such as the categorization of images (or materials), the determination of stories, the selection of images, and the selection of links of images, for example. Therefore, there exists needs for the automation of image editing tasks.

In this situation, technologies of automatically editing images have been developed. One of these technologies is disclosed in Japanese Patent Laid-open No. 2009-153144 in which an event for example reflecting a flow of content indicated by a moving image is extracted from this moving image and digest images with scenes reflecting the flow of content linked are automatically generated, for example.

SUMMARY

An editing apparatus (hereafter referred to as a "related-art editing apparatus") with a related-art technology for automatically executing image editing (hereafter referred to simply as a "related-art technology") applied extracts scenes from a moving image from the viewpoint of a concept "introduction, development, turn, and conclusion" and generates a digest image with the extracted scenes linked. However, because the related-art editing apparatus extracts scenes from a moving image on the basis of this concept "introduction, development, turn, and conclusion," if a moving image indicative of a piece of content in which this content "introduction, development, turn, and conclusion" is not established, the related-art editing apparatus cannot always extract scenes from the moving image concerned.

In another method of automatically editing images, it is supposed that an editing apparatus select images from among two or more images and link the selected images in a time-dependent manner on the basis of a story template for specifying a flow of content (or a so-called story) indicated by images created after editing, for example.

However, a candidate image suitable for a story template does not typically exist among images (hereafter referred to as "candidate images") that can be subjected to editing. Therefore, in the case where a story template is used, if there is no candidate image suitable for the story template, it is possible that no story specified by this story template can be completed or an incomplete image is obtained as an edited image.

Moreover, if there is no candidate image suitable for a story template, the editing apparatus selects given candidate images from among candidate images for example to provide an tentatively finished image as an edited image. In this case, however, the point of editing based on story templates cannot be made most of.

Even if automatic editing is executed by use of related-art technologies or story templates, the extraction of scenes matching the point of view of "introduction, development, turn, and conclusion" (or a kind of story) or the selection of candidate images matching a story cannot be sometimes executed. Therefore, even if automatic editing is executed by use of related-art technologies or story templates, incomplete images may be obtained as edited images, thereby making it possible that the edited images do not always provide the images desired by the user.

Therefore, the present disclosure addresses the above-identified and other problems associated with related-art methods and apparatuses and solves the addressed problems by providing an editing apparatus, an editing method, a program, and a recording media that are configured to select images corresponding to a story from among two or more candidate images in very image selection time to edit the images thus selected.

In carrying out the disclosure and according to a first mode thereof, there is provided an editing apparatus. This editing apparatus has a story determination block configured to determine story expressed by a time function and providing a reference for selecting an image from among a plurality of candidate images; an evaluation value computation block configured to compute an evaluation value for each of the plurality of candidate images for each selection time in the story on the basis of the story determined by the story determination block and at least one feature value indicative of a feature of each of the plurality of candidate images set to each thereof; an image selection block configured to select an image for each selection time from among the plurality of candidate images on the basis of the evaluation value computed by the evaluation value computation block; and an editing processing block configured to link selection images that are images selected by the image selection block for each selection time each other in a time-dependent manner.

In the above-mentioned novel configuration, images corresponding to a story can be selected from among two or more candidate images for each selection time to edit the selected images.

In the above-mentioned editing apparatus, the evaluation value computation block computes, as the evaluation value, a Manhattan distance based on a feature value of each of the plurality of candidate images and an expected value of the feature value of each of the plurality of candidate images for each selection time.

In the above-mentioned editing apparatus, the image selection block selects a candidate image having a minimum evaluation value at each selection time as the selection image for each selection time.

In the above-mentioned editing apparatus, the image selection block selects the selection image for each selection time from among the plurality of candidate images with an already selected candidate image excluded.

The above-mentioned editing apparatus further has an image evaluation block configured to set the feature value for each of the plurality of candidate images on the basis of the plurality of candidate images.

In the above-mentioned editing apparatus, if any of the plurality of candidate images is a moving image exceeding in reproduction time a predetermined time, the image evaluation block divides the moving image such that the reproduction time falls within the predetermined reproduction time and sets the feature value to each of a plurality of candidate images resulted from the division.

The above-mentioned editing apparatus still further has a candidate image determination block configured to determine each of the plurality of candidate images in accordance with a user operation.

The above-mentioned editing apparatus yet further has a communication block configured to execute communication with an external apparatus, wherein the story determination block determines the story on the basis of story information indicative of the story transmitted from the external apparatus received by the communication block.

In the above-mentioned editing apparatus, the story is expressed by a time function using a feature value indicative of a feature quantity of an image.

In the above-mentioned editing apparatus, the story is expressed by a time function using information indicative of a category of an image.

In carrying out the disclosure and according to a second mode thereof, there is provided an editing method. This editing method has: determining story expressed by a time function and providing a reference for selecting an image from among a plurality of candidate images; computing an evaluation value for each of the plurality of candidate images for each selection time in the story on the basis of the story and at least one feature value indicative of a feature of each of the plurality of candidate images set to each thereof; selecting an image for each selection time from among the plurality of candidate images on the basis of the evaluation value; and linking selection images that are images selected for each selection time each other in a time-dependent manner.

The above-mentioned novel method allows the selection of images corresponding to a story from among two or more candidate images for each selection time to edit the selected images.

In carrying out the disclosure and according to a third mode thereof, there is provided a computer program. This program causes a computer to execute the steps of: determining story expressed by a time function and providing a reference for selecting an image from among a plurality of candidate images; computing an evaluation value for each of the plurality of candidate images for each selection time in the story on the basis of the story determined by the story determination block and at least one feature value indicative of a feature of each of the plurality of candidate images set to each thereof; selecting an image for each selection time from among the plurality of candidate images on the basis of the evaluation value computed by the evaluation value computation block; and linking selection images that are images selected by the image selection block for each selection time each other in a time-dependent manner.

The above-mentioned novel computer program allows the selection of images corresponding to a story from among two or more candidate images for each selection time to edit the selected images.

In carrying out the disclosure and according to a fourth mode thereof, there is provided a computer-readable recording media. This novel recording media records a program for causing a computer to execute the steps of: determining story expressed by a time function and providing a reference for selecting an image from among a plurality of candidate images; computing an evaluation value for each of the plurality of candidate images for each selection time in the story on the basis of the story determined by the story determination block and at least one feature value indicative of a feature of each of the plurality of candidate images set to each thereof; selecting an image for each selection time from among the plurality of candidate images on the basis of the evaluation value computed by the evaluation value computation block; and linking selection images that are images selected by the image selection block for each selection time each other in a time-dependent manner.

The above-mentioned novel recording media allows the selection of images corresponding to a story from among two or more candidate images for each selection time to edit the selected images.

As described above and according to embodiments of the present disclosure, images corresponding to a story can be selected from among two or more candidate images for each selection time to edit the selected images.

BRIEF DESCRIPTION OF THE DRAWINGS

FIG. 2 is a diagram indicative of exemplary feature values set to candidate images practiced as another embodiment of the disclosure;

FIG. 5 is a diagram for describing exemplary image selection processing in the editing apparatus of FIG. 1;

FIG. 6 is a diagram for describing another exemplary image selection processing in the editing apparatus of FIG. 1;

DETAILED DESCRIPTION OF THE PREFERRED EMBODIMENTS

Figure 1:
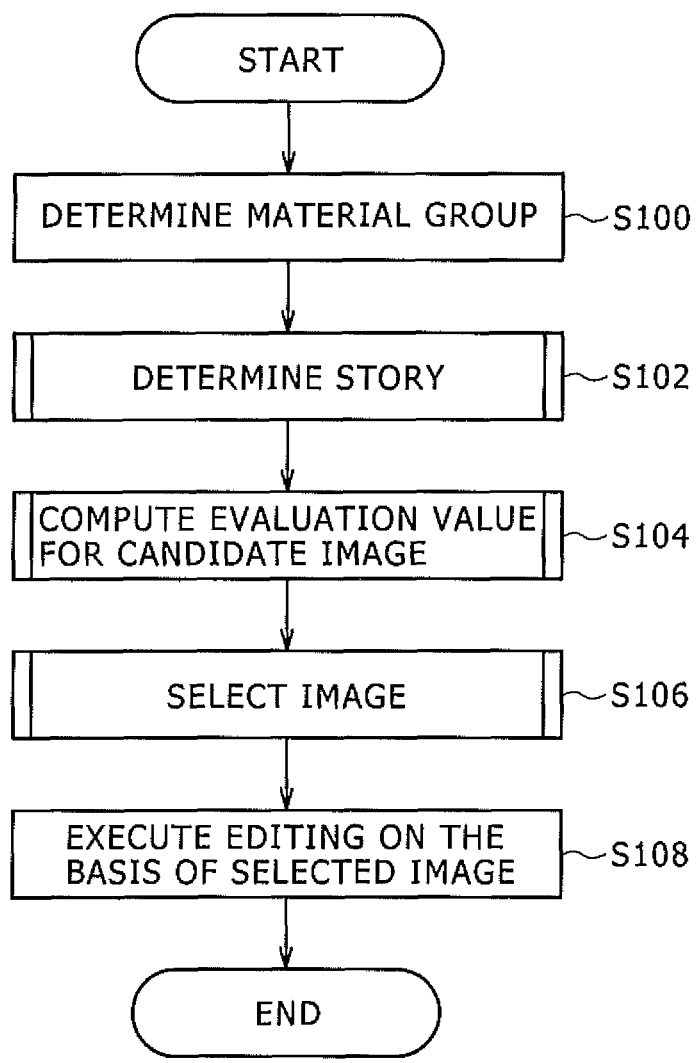
FIG. 1 is a flowchart indicative of exemplary processing associated with an editing approach in an editing apparatus practiced as one embodiment of the disclosure.

This disclosure will be described in further detail by way of embodiments thereof with reference to the accompanying drawings. It should be noted that component blocks having substantially similar functional configurations are denoted by the same reference numerals and the duplicate explanation will be skipped.

The description of the embodiments of the present disclosure will be made in the following order:

(1) an approach (or a method) practiced as one embodiment of the present disclosure;

(2) a control apparatus practiced as another embodiment of the present disclosure;

(3) a program practiced as still another embodiment of the present disclosure; and (4) a recording media in which the program practiced as one embodiment of the present disclosure is stored.

Approach Practiced as One Embodiment of the Present Disclosure

Before describing an exemplary configuration of an editing apparatus (hereafter referred to as an editing apparatus 100) practiced as one embodiment of the disclosure, an approach in which images practiced as one embodiment of the disclosure are edited will be described. An image practiced as one embodiment of the disclosure is a still image or a moving image. In what follows, candidate images that can be edited may sometimes referred to as "materials." It should be noted that the processing associated with the approach practiced as one embodiment of the disclosure may be understood as the processing associated with an editing method practiced as one embodiment of the disclosure.

Overview of the Editing Approach

As described above, even if automatic editing is executed by use of related-art technologies or story templates, candidate images matching a story may not be selected. As described above, if a situation in which candidate images cannot be selected, there occurs a fear of obtaining incomplete images as edited images, so that the edited images do not always provide the images desired by the user.

Therefore, on the basis of feature values set to each of candidate images, the editing apparatus 100 practiced as one embodiment of the present disclosure computes an evaluation value of each candidate image at each selection time. In addition, on the basis of the evaluation value computed at each selection time, the editing apparatus 100 selects images from the candidate images. Then, the editing apparatus 100 links the selection images selected at the selection times each other in a time-dependent manner, thereby generating an edited image.

The story associated with one embodiment of the disclosure herein denotes a reference by which images are selected from among two or more candidate images, which are expressed by a function (details thereof will be described later). The selection time associated with one embodiment of the disclosure herein denotes a time with which an evaluation value is computed in each story. To be more specific, the selection time associated with one embodiment of the disclosure is indicative of a time for executing processing for selecting candidate images along a story. For example, this selection time is an elapsed time from a time at which editing is started (expressed by second, minute, or hour, for example). The selection time associated with one embodiment of the disclosure may be a time that is specified in advance or a time set by the user as desired.

As described above, the editing apparatus 100 sequentially computes an evaluation value of each selection time on the basis of a story expressed by time functions and the feature value set to the candidate images and sets the candidate image (namely, the candidate image having a higher value) having the minimum (or maximum) evaluation value for each selection time for example as the selection image for each selection time. Therefore, the editing apparatus 100 practiced as one embodiment of the disclosure prevents a situation from being caused in which no selection image is selected in each selection time that may happen in automatic editing by use of a related-art technology or a story template. Consequently, the editing apparatus 100 can select images corresponding to a story from among two or more candidate images for each image selection time, thereby editing the selected images.

In addition, the editing apparatus 100 selects, as a selection image, a candidate image (an evaluation image having a minimum evaluation value or an evaluation image having a maximum evaluation value, for example) having a high evaluation value computed from among two or more candidate images, so that, if editing is executed on unspecified many candidate images, a selection image that is closer to the story can be selected. Consequently, if candidate images dynamically change as with the case where images of an image community site in which two or more users add or delete images as desired are processed as candidate images, for example, the editing apparatus 100 can select selection images closer to the story from among the candidate images.

Further, because the editing apparatus 100 uses stories expressed by time functions, the editing apparatus 100 can extend or shorten stories in accordance with the setting of a selection time, for example. On the other hand, story templates are created by creators, namely, human beings, so that automatic changing of the story templates is difficult. To be more specific, it is difficult to extend or shorten stories by changing the story templates. Therefore, in order to extend or shorten a story when a story template is used, it is required to prepare two or more story templates and change the prepared story templates from time to time, for example. Consequently, by use of a story expressed by time functions, the editing apparatus 100 can extend or shorten a story more easily than the use of a story template in which it is difficult to extend or shorten a story unless the template itself is changed. Therefore, by use of a story expressed by time functions, the editing apparatus 100 can edit more versatile images.

Specific Example of Processing Associated with the Editing Approach

The following describes an example of processing for realizing the above-mentioned editing approach practiced as one embodiment of the disclosure. Referring to FIG. 1, there is shown a flowchart indicative of one example of processing associated with the editing approach in the editing apparatus 100 practiced as one embodiment of the disclosure.

First, the editing apparatus 100 determines a material group (S100). When the processing of step S100 is executed, a candidate image is determined. A material group herein denotes a group of candidate images categorized by predetermined themes, such as athletic festival, wedding party, and sea, for example. The material group herein may be a group manually categorized by the user or a group automatically categorized by the editing apparatus 100 or an external apparatus such as a server by executing image processing.

The editing apparatus 100 executes the processing of step S100 on the basis of a user operation, for example. It should be noted that above-mentioned "executes the processing of step S100 on the basis of a user operation" herein denotes that the editing apparatus 100 executes processing in accordance with an operation signal corresponding to a user operation transmitted from an operator part (to be described later), an external operation signal corresponding to a user operation transmitted from an external operator device such as a remote controller, or an operation signal transmitted from an external apparatus via a network (or directly).

It should be noted that the editing apparatus 100 practiced as one embodiment of the disclosure may not execute the processing of step S100 shown in FIG. 1. If the editing apparatus 100 does not execute the processing of step S100, then the editing apparatus 100 selects a selection image from among the candidate images not especially grouped determined by a user operation, for example.

As described above, the editing apparatus 100 execute processing on the basis of a feature value set to candidate images determined in step S100, for example. The following describes the feature value set to the candidate images practiced as one embodiment of the disclosure.

Referring to FIG. 2, there is shown a diagram indicative of one example of feature values set to the candidate images associated with one embodiment of the disclosure. FIG. 2 shows one example of feature values set to images m1 through m14.

Each candidate image is set with a feature value (or a so-called score for each category (C). The category herein denotes a point of attention for categorizing images to determine the direction of edited images. The category herein may be a predetermined one or one selected by the user as desired from among two or more category candidates, for example. The categories herein include time (c1) indicative of a point of attention based on a time at which an image was taken, a place (c2) indicative of a point of attention based on a place at which an image was taken, an image angle (c3) indicative of a point of attention based on an image angle, a portrait degree (c4) indicative of a point attention based on whether a subject of imaging is a particular one or not, and a motion degree (c5) indicative of a point of attention based on how much a subject of imaging or an imaging apparatus is moving (may including panning or zoom), for example. It should be noted that the categories herein are not limited to those mentioned above; for example, the categories herein may indicate a point of attention based on the number of subjects of imaging, shutter speeds, and so on.

The editing apparatus 100 sets a feature value to each candidate image by executing image analysis on each candidate image and referring to metadata of each candidate image, for example. In setting a feature value of place (c2) for example, the editing apparatus 100 sets a feature value of each candidate image in 10 steps in accordance with a linear distance between the position of the editing apparatus 100 obtained by use of GPS (Global Positioning System) and the position at which each candidate image was taken. In addition, in setting a feature value of image angle (c3), the editing apparatus 100 sets a feature value of each candidate image in 10 steps with the wide side being 1 and the telephoto side being 10. In setting portrait degree (c4), the editing apparatus 100 sets a feature value of each candidate image in 10 steps with a candidate image having no subject of imaging being 1 and a candidate image paying attention paid to a particular subject of imaging (the subject of imaging at the center of the image, for example) being 10. It should be noted that the method of setting feature values in the editing apparatus 100 is not limited to one described above; for example, normalized feature values obtained by normalizing specific values may be set.

In addition, if a candidate image is a moving image that exceeds a predetermined duration of time in reproduction time, for example, then the editing apparatus 100 can divide the candidate image by the time axis so that the reproduction time falls within the predetermined duration of time. If this division is used, the editing apparatus 100 sets a feature value to each divided candidate image. In this case, the editing apparatus 100 identifies the reproduction time of the candidate image concerned by referencing the metadata of the candidate image. However, the method of identifying the reproduction time of each candidate image associated with one embodiment of the disclosure is not limited to that described above. The above-mentioned predetermined duration of time may be predetermined one or one set in accordance with a user operation, for example.

As described, the editing apparatus 100 divides the candidate image by the time axis so that the reproduction time falls within the predetermined duration of time, and sets a feature value to each divided candidate image. Therefore, the editing apparatus 100 can set a feature value closer to the feature of the image as compared to the case where a feature value is set to an undivided candidate image.

As described above, a feature value of category (C) for candidate image (M) is expressed as "S(M,C)." For example, a feature value of category (c2) in image m1 shown in FIG. 2 is expressed as S(m1,c2)=1. It should be noted that FIG. 2 show an example in which two or more categories (C) are set to each candidate image; obviously, only one category (C) may be set to each candidate image associated with one embodiment of the disclosure.

The editing apparatus 100 sets a feature value to each candidate image as described above, for example. The editing apparatus 100 sets a feature value to an image determined as a candidate image in step S100, for example, but the processing in the editing apparatus 100 practiced as one embodiment of the disclosure is not limited to this processing. For example, regardless whether the processing of step S100 has been executed or not, the editing apparatus 100 can execute the processing of setting a feature value to an image that can provide a candidate image. Without executing the processing of setting an evaluation value, it is also practicable for the editing apparatus 100 to transmit a candidate image (or an image that can provide a candidate image) to an external apparatus such as a server and executes processing associated with evaluation value computation to be described later by use of a feature value set in the external apparatus concerned.

The following describes one example of processing associated with the editing approach in the editing apparatus 100 practiced as one embodiment of the disclosure with reference to FIG. 1 again. When a material group is determined in step S100, the editing apparatus 100 determines a story (story determination processing in step S102). The editing apparatus 100 determines a story on the basis of an operation signal corresponding to a user operation transmitted from an operator block (to be described later) or an external operation signal corresponding to a user operation transmitted from an external operation device such as a remote controller, for example. It should be noted that the method of determining a story in the editing apparatus 100 is not limited to one described above. For example, if story information recorded with a story transmitted from an external apparatus connected to the editing apparatus 100 is received via a network (or directly), then the editing apparatus 100 can determine the story indicated by the received story information as the story for use in the processing to be described later.

As described above, the story associated with one embodiment of the disclosure provides a reference by which to select images from among two or more candidate images and is expressed by a time function. Each story is expressed by use of both an expected value (SX) of a feature value of each candidate image at selection time t1 and the feature value. In what follows, an expected value at selection time t of the category (cn) (n being an integer of 1 or higher) in each candidate image is indicated as "SX(cn,t)."

In equations (1) through (3) below are indicative of one example of the story associated with one embodiment of the disclosure. Equation (1) shows one example of the story for computing Manhattan distance D(M)(t) based on both a feature value of candidate image (M) and an expected value of the candidate image, as an expected value at selection time t. Equations (2) and (3) are indicative of one example of an expected value for each category at selection time t. N in equation (1) and equation (3) denotes the number of categories of each candidate image.

$$D(M)(t) = \sum^{N} |S(M, cn) - SX(cn, t)|(t) \tag{1}$$

$$SX(c1, t) = \frac{1}{2} \cdot t \tag{2}$$

$$SX(ci, t) = t, i = 2 \ldots N \tag{3}$$

It should be noted that the story associated with one embodiment of the disclosure is not limited to those shown in equation (1) through equation (3) mentioned above. For example, the editing apparatus 100 may compute a Manhattan distance as an evaluation value by weighting category (C) regardless of real distance. In addition, the editing apparatus 100 can use a story based on a user operation by making the user enter an expected value for category (C), for example. Further, the editing apparatus 100 can present a graph (a graph with time along the horizontal axis and expected values along the vertical axis) of a story that is a time function to the user to use, as a story, the value of an expected value changed according to a user operation and indicated by this graph.

Example of Story Determination Processing

Figure 3:
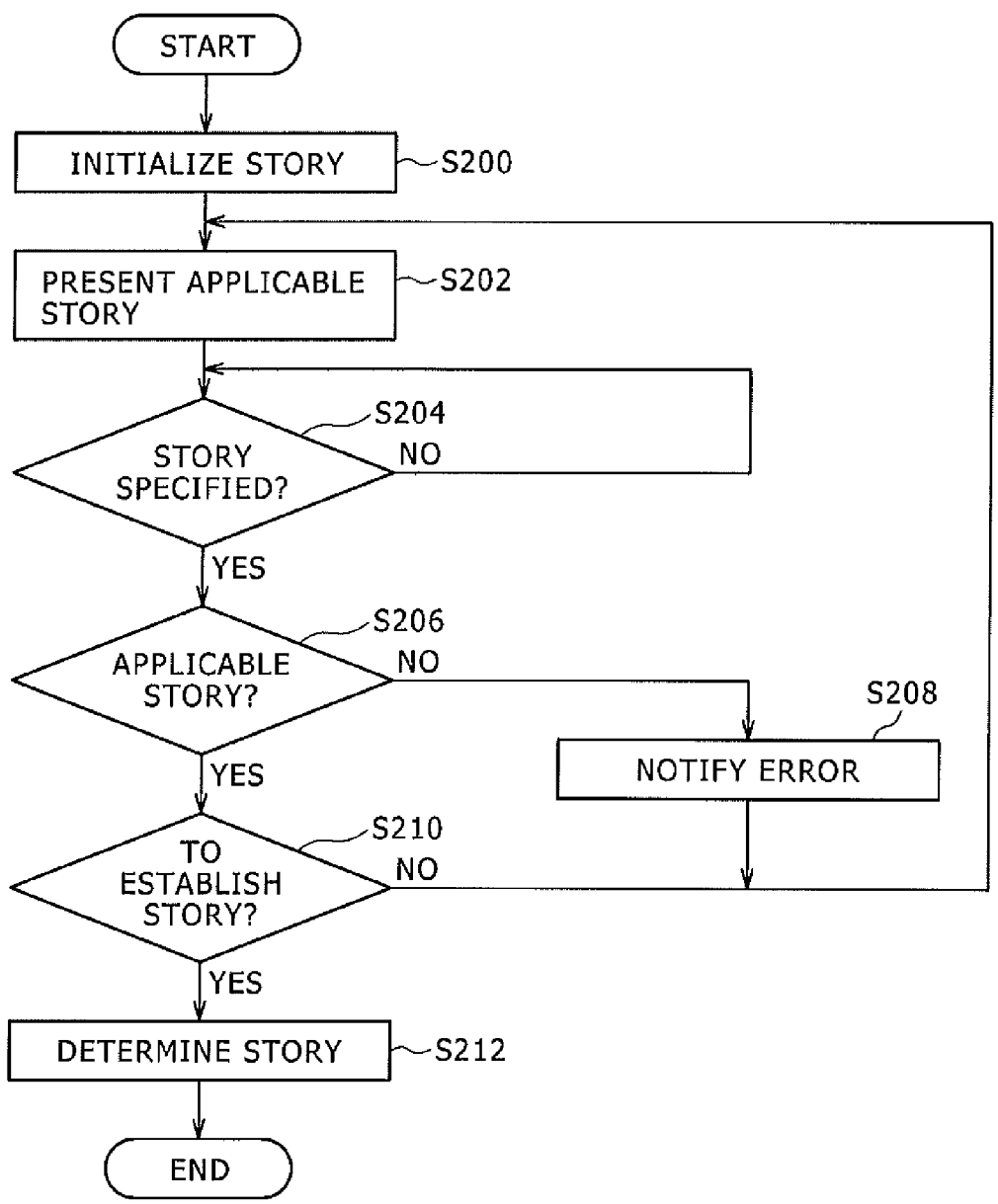
FIG. 3 is a flowchart indicative of exemplary story determination processing in the editing apparatus of FIG. 1.

The following more specifically describes the story determination processing that is executed in the editing apparatus 100 practiced as one embodiment of the disclosure. Referring to FIG. 3, there is shown a flowchart indicative of the story determination processing to be executed in the editing apparatus 100 practiced as one embodiment of the disclosure. FIG. 3 shows one example of processing to be executed by the editing apparatus 100 for determining a story on the basis of an operation signal corresponding to a user operation or an external operation signal corresponding to a user operation. The following describes an example in which the editing apparatus 100 determines a story on the basis of an operation signal corresponding to a user operation.

The editing apparatus 100 initializes a story (S200). It should be noted that the processing of step S200 is equivalent to the processing of setting a preset story for example. The editing apparatus 100 executes the processing of step S200 by reading story information from a storage unit (to be described later) for example. It should also be noted that the processing of step S200 to be executed by the editing apparatus 100 is not limited to the above-mentioned processing. For example, the editing apparatus 100 can communicate with an external apparatus such as a server in which story information is stored and execute the processing of step S200 by use of the story information thus obtained from the external apparatus.

When the story has been initialized in step S200, then the editing apparatus 100 presents an applicable story (S202). An application story herein denotes a story that does not correspond to any stories on which an error is detected in step S208 to be described later. Namely, the story initialized in step S200 is presented in step S202.

When a story is presented in step S202, then the editing apparatus 100 determines whether the story has been specified or not (S204). The editing apparatus 100 executes the processing of step S204 on the basis of an operation signal corresponding to a user operation for example.

If a story is found not specified in step S204, then the editing apparatus 100 does not advance the procedure any further until a story is found specified. It should be noted that, although not shown in FIG. 3, if no operation signal has been detected for a predetermined time after the execution of the processing in step S202 for example, the editing apparatus 100 may terminate the story determination processing (this is regarded as time running out). If this happens, the editing apparatus 100 notifies the user of the termination of the story determination processing, for example.

If a story is found specified in step S204, then the editing apparatus 100 determines whether the specified story is an applicable story or not (S206). As described above, the editing apparatus 100 can use a story based on a user operation by making the user enter an expected value for category (C), for example. If an abnormal value has been entered by the user, the editing apparatus 100 determines that the specified story is not an applicable story.

If the specified story is found to be an applicable story in step S206, then the editing apparatus 100 gives error information (S208). The editing apparatus 100 repeats the processing of step S202 therefrom. The editing apparatus 100 gives error information visually and/or audibly by displaying an error screen on the display screen and/or outputting an error sound. However, the processing of step S208 to be executed by the editing apparatus 100 is not limited to one mentioned above.

If the specified story is found to be an applicable story in step S206, then the editing apparatus 100 determines whether this story is to be established or not (S210). The editing apparatus 100 makes the user display a screen for letting the user select the establishment of the story on the display screen and executes the determination of step S210 on the basis of an operation signal corresponding to a user operation.

If the story is found not to be established in step S210, then the editing apparatus 100 repeats the above-mentioned processing of step S202 therefrom.

If the story is found to be established in step S210, then the editing apparatus 100 determines the story specified in step S204 to be the story for use in the processing (S212), thereby terminating the story determination processing.

The editing apparatus 100 determines a story by executing the processing shown in FIG. 3 for example. Obviously, the story determination processing practiced as one embodiment of the disclosure is not limited to one shown in FIG. 3.

The following describes one example of processing associated with the editing approach in the editing apparatus 100 practiced as one embodiment of the disclosure with reference to FIG. 1 again. When a story is determined in step S102, then the editing apparatus 100 computes an evaluation value for a candidate image (evaluation value computation processing in step S104).

Example of Evaluation Value Computation Processing

Figure 4:
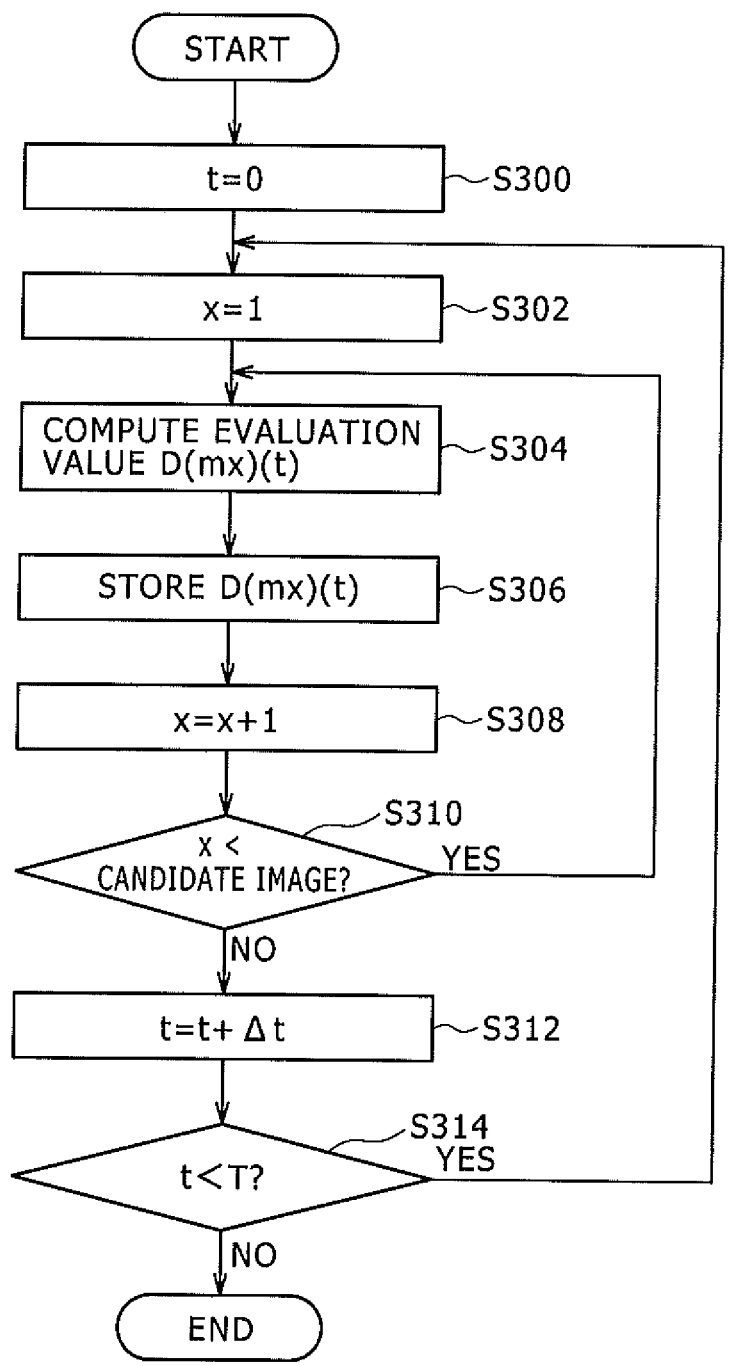
FIG. 4 is a flowchart indicative of exemplary evaluation value computation processing in the editing apparatus of FIG. 1.

Referring to FIG. 4, there is shown a flowchart indicative of one example of evaluation value computation processing to be executed by the editing apparatus 100 practiced as one embodiment of the disclosure. FIG. 4 shows one example in which the editing apparatus 100 computes Manhattan distance $D(M)(t)$ based on a feature value of candidate image (M) and an expected value of the candidate image shown in equation (1) as an evaluation value at selection time t. With FIG. 4, it is assumed that each candidate image be expressed by mx (x being an integer of 1 or higher) as shown in FIG. 2.

The editing apparatus 100 sets t=0 as a value of selection time t (S300) and sets x=0 as a value of x for specifying a candidate image for which an evaluation value is computed (S302).

When the processing of step S302 is executed, the editing apparatus 100 computes evaluation value $D(mx)(t)$ for the candidate image (mx) (S304). Here, the editing apparatus 100 computes Manhattan distance $D(mx)(t)$ as an evaluation value by use of the expected value established by equation 1 and in step S212 shown in FIG. 3, for example.

If evaluation value $D(mx)(t)$ is computed in step S304, then the editing apparatus 100 stores computed evaluation value $D(mx)(t)$ (S306). Next, the editing apparatus 100 updates a value of x to x+1 (S308).

If a value of x is updated in step S308, the editing apparatus 100 determines whether the value of x is smaller than the number of candidate images (S310). If the value of x is found to be smaller than the number of candidate images in step S310, it indicates that there is a candidate image for which an evaluation value has not been computed, so that the editing apparatus 100 repeats the above-mentioned processing from step S304.

If the value of x is found to be not smaller than the number of candidate images in step S310, then the editing apparatus 100 updates a value of t to t+Δt (S312). Here, Δt associated with one embodiment of the disclosure specifies an interval of selection time t. In FIG. 4, Δt is constant for example; however, Δt associated with one embodiment of the disclosure need not always be constant. For example, Δt may be an uncertain value changed by the user and may be set at random by the editing apparatus 100.

When the value of t is updated in step S312, then the editing apparatus 100 determines whether the value of t is smaller than total time T for reproducing the edited image (S314). Total reproduction time T associated with one embodiment of the disclosure may be a predetermined value or a value set in accordance with a user operation.

If the value of t is found to be smaller than total reproduction time T in step S314, then the editing apparatus 100 repeats the above-mentioned processing from step S302. If the value of t is found to be not smaller than total reproduction time T in step S314, then the editing apparatus 100 terminates the evaluation value computation processing.

By executing the processing shown in FIG. 4 for example, the editing apparatus 100 computes an evaluation value of each candidate image for each selection time. It should be noted that the evaluation value computation processing associated with one embodiment of the disclosure is not limited to that shown in FIG. 4.

The following describes one example of the processing of editing approach to be executed in the editing apparatus 100 associated with one embodiment of the disclosure with reference to FIG. 1 again. When an evaluation value for the candidate image is computed in step S104, then the editing apparatus 100 selects selection images from among candidate images on the basis of the computed evaluation value (the image selection processing in step S106).

Referring to FIG. 5, there is shown one example of the image selection processing to be executed in the editing apparatus 100 associated with one embodiment of the disclosure. FIG. 5 shows evaluation values ("A" in FIG. 5) computed at selection times t and selection images to be selected at selection times t ("B" in FIG. 5) by applying the stories indicated by equations (1) through (3) to the candidate images m1 through m14 shown in FIG. 2.

As shown in FIG. 5, if Manhattan distance D(M)t is computed as an evaluation value, a candidate image having the minimum evaluation value at each selection time t is selected as a selection image. It should be noted that the editing apparatus 100 practiced as one embodiment of the disclosure need not always select the candidate image that has the minimum evaluation value for a selection image but may select the candidate image that has the maximum evaluation value for a selection image. To be more specific, on the basis of evaluation values, the editing apparatus 100 selects a candidate image having a higher evaluation value. Therefore, the editing apparatus 100 can select candidate images along a story at every selection time. In addition, if there are two or more candidate images having the minimum (or maximum) evaluation value, the editing apparatus 100 can select a candidate image from among these two or more candidate images at random or in accordance with a predetermined candidate image priority, for example.

It should be noted that the image selection processing to be executed by the editing apparatus 100 practiced as one embodiment of the disclosure is not limited to one in which the same candidate image is selected two or more times as the selection image as shown in FIG. 5. FIG. 6 shows another example of the image selection processing to be executed in the editing apparatus 100 practiced as one embodiment of the disclosure. As with FIG. 5, FIG. 6 shows evaluation values ("C" in FIG. 6) computed at selection times t and selection images to be selected at selection times t ("D" in FIG. 6) by applying the stories indicated by equations (1) through (3) to the candidate images m1 through m14 shown in FIG. 2.

As shown in FIG. 6, the editing apparatus 100 can exclude the candidate image once selected as a selection image and newly select a selection image from among the excluded candidate images. By selecting a selection image as shown in FIG. 6, the selection of the same candidate image can be prevented from being selected as a selection image, so that the editing apparatus 100 can generate images that are more versatile than the images obtained by the possessing shown in FIG. 5.

One Example of Image Selection Processing

Figure 7:
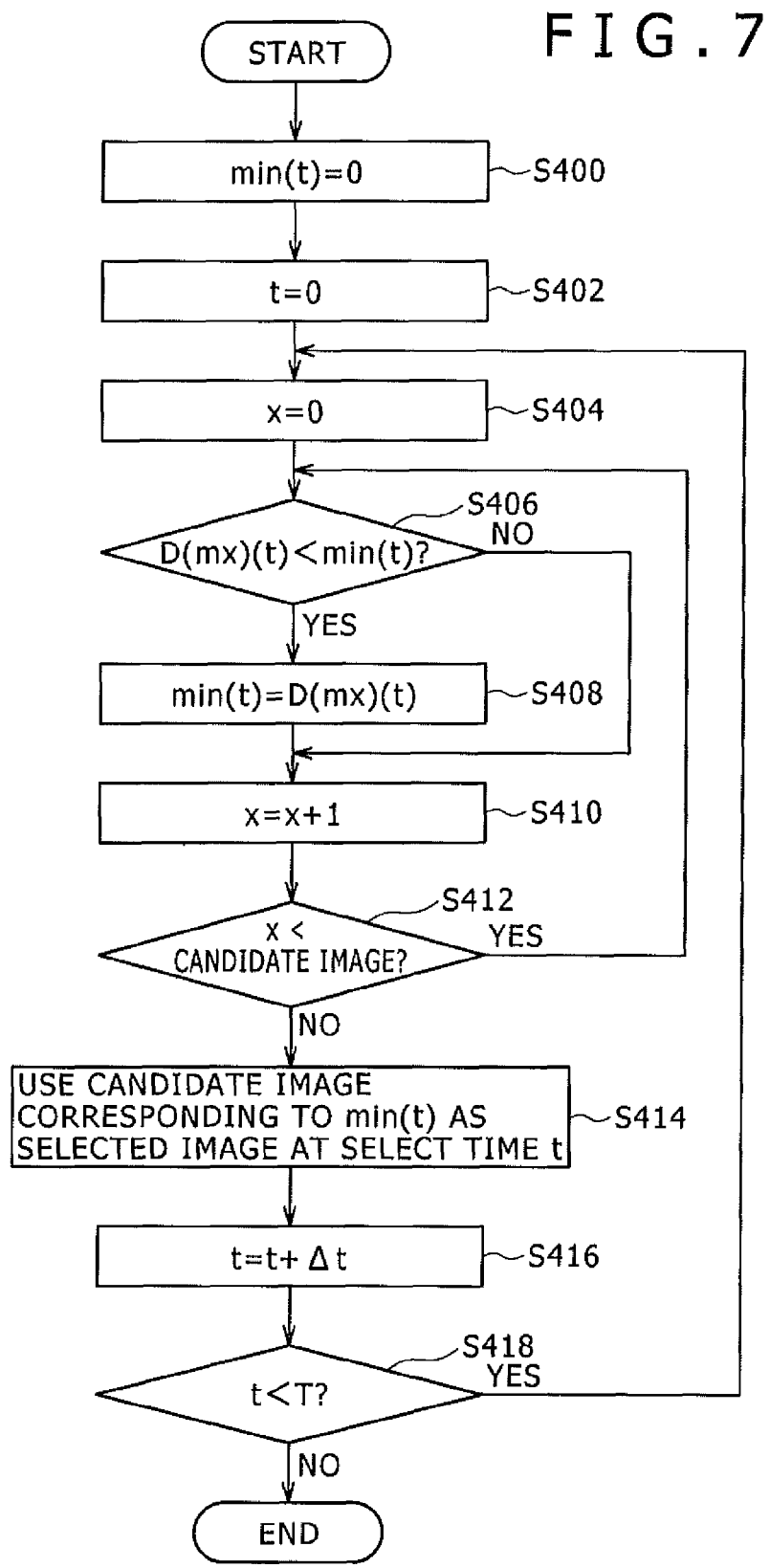
FIG. 7 is a flowchart indicative of exemplary image selection processing in the editing apparatus of FIG. 1.

The following more specifically describes the image selection processing to be executed in the editing apparatus 100 practiced as one embodiment of the disclosure. FIG. 7 is a flowchart indicative of one example of the image selection processing to be executed in the editing apparatus 100 practiced as one embodiment of the disclosure. Here, FIG. 7 shows one example of the image selection processing to be executed if the editing apparatus 100 computes Manhattan distance D(M)(t) based on a feature value of a candidate image (M) and an expected value of the candidate image shown in equation (1) as an evaluation value at selection time t. In addition, as shown in FIG. 5, FIG. 7 shows one example of the image selection processing in which the same candidate image is selected as a selection image at two or more selection times t. Further, FIG. 7 shows the processing to be executed in the case where, if there are two or more candidate images having the same evaluation value, the candidate image processed earlier is preferentially selected as a selection image.

The editing apparatus 100 sets min(t)=0 as a value of minimum value min(t) of an evaluation value at selection time t (S400). In addition, like step S300 and step S302 shown in FIG. 4, the editing apparatus 100 sets t=0 as a value of selection time t (S402) and x=0 as a value of x specifying a candidate image for which an evaluation value is computed (S404).

When the processing of step S404 is executed, the editing apparatus 100 determines whether the value of evaluation value D(mx)(t) is smaller than min(t) or not (S406). If the value of evaluation value D(mx)(t) is found to be not smaller than min(t) in step S406, then the editing apparatus 100 executes the processing of step S410 to be described later.

If the value of evaluation value D(mx)(t) is found to be smaller than min(t) in step S406, then the editing apparatus 100 updates the value of min(t) to min(t)=D(mx)(t) (S408).

If the value of evaluation value D(mx)(t) is found to be not smaller than min(t) in step S406 or if the processing of step S408 is executed, then the editing apparatus 100 updates the value of x to x+1 (S410).

When the value of x is updated in step S410, then the editing apparatus 100 determines whether the value of x is smaller than the number of candidate images or not (S412). If the value of x is found to be smaller than the number of candidate images in step S412, then the editing apparatus 100 repeats the above-mentioned processing from step S406.

If the value of x is found to be not smaller than the number of candidate images in step S412, the editing apparatus 100 selects the candidate image corresponding to min(t) as the selection image at selection time t (S414).

When the processing of step S414 is executed, the editing apparatus 100 updates the value of t to t+Δt (S416). Next, the editing apparatus 100 determines whether the value of t is smaller than total time T for reproducing the edited image or not (S418).

If the value of t is found to be smaller than total reproduction time T in step S418, then the editing apparatus 100 repeats the above-mentioned processing from step S404. If the value of t is found to be not smaller than total reproduction time T in step S418, then the editing apparatus 100 terminates the image selection processing.

By executing the processing shown in FIG. 7 for example, the editing apparatus 100 selects a candidate image (namely, a candidate image having a higher evaluation) having the minimum value of evaluation value at each selection time as the selection image at each selection time. It should be noted that the image selection processing associated with one embodiment of the disclosure is not limited to the example shown in FIG. 7.

The following describes one example of the processing associated with the editing approach to be executed in the editing apparatus 100 practiced as one embodiment of the disclosure with reference to FIG. 1 again. When a selection image for each selection time is selected in step S106, the editing apparatus 100 links the selection images with each other in a time dependent manner, thereby editing the linked selection images (the editing processing in step S108).

For example, by executing the processing shown in FIG. 1, the editing apparatus 100 sequentially can compute evaluation values for selection times on the basis of a story expressed by a time function and a feature value set to each candidate image, thereby selecting a candidate image having the minimum evaluation value (a candidate image high a higher evaluation) for each selection time as a selection image for each selection time. Therefore, by executing the processing shown in FIG. 1 for example, the editing apparatus 100 can prevent a situation in which no selection image is selected at each selection time, this situation possibly happening by executing automatic editing by use of related-art technologies or story templates. Consequently, by executing the processing shown in FIG. 1 for example, the editing apparatus 100 can select images corresponding to a story from among two or more candidate images for each selection time for image selection, thereby editing the selected images. It should be noted that the processing associated with the editing approach practiced as one embodiment of the disclosure is not limited to the example shown in FIG. 1.

In the above description, the processing associated with the editing approach practiced as one embodiment of the disclosure is executed by the editing apparatus 100. However, the processing associated with the editing approach practiced as one embodiment of the disclosure is not limited to the implementation by one unit of apparatus. For example, the processing associated with the editing approach practiced as one embodiment of the disclosure (namely, the processing associated with the editing method practiced as one embodiment of the disclosure) may be realized by the distributed processing in a system (namely, an editing system) subject to the connection to a network, such as a cloud computing network, for example.

Editing Apparatus Practiced as One Embodiment of the Disclosure

Figure 8:
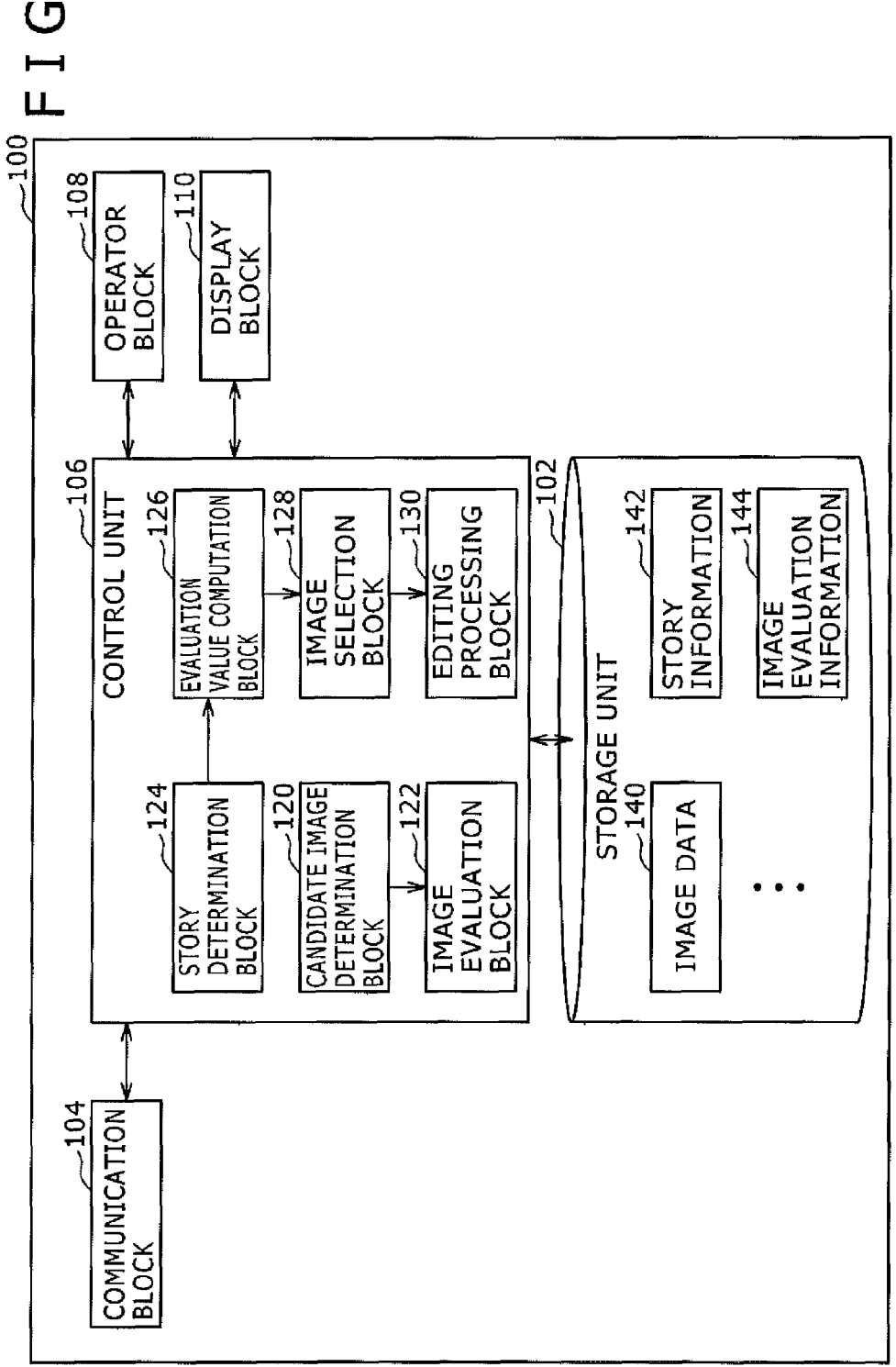
FIG. 8 is a block diagram illustrating an exemplary configuration of the editing apparatus of FIG. 1.

The following describes an exemplary configuration of the editing apparatus 100 practiced as one embodiment of the disclosure that can execute the processing associated with the above-mentioned editing approach practiced as one embodiment of the disclosure. Referring to FIG. 8, there is shown a block diagram illustrating an exemplary configuration of the editing apparatus 100 practiced as one embodiment of the disclosure.

Referring to FIG. 8, the editing apparatus 100 has a storage unit 102, a communication block 104, a control unit 106, an operator block 108, and a display block 110, for example.

In addition, the editing apparatus 100 may have a ROM (Read Only Memory) and a RAM (Random Access Memory), both not shown. The editing apparatus 100 interconnects the above-mentioned component blocks via bus that provides a data transmission path, for example. The ROM (not shown) stores programs and control data such as operation parameters for use by the control unit 106, for example. The RAM (not shown) temporarily stores programs to be executed by the control unit 106, for example.

Exemplary Hardware Configuration of the Editing Apparatus 100

Figure 9:
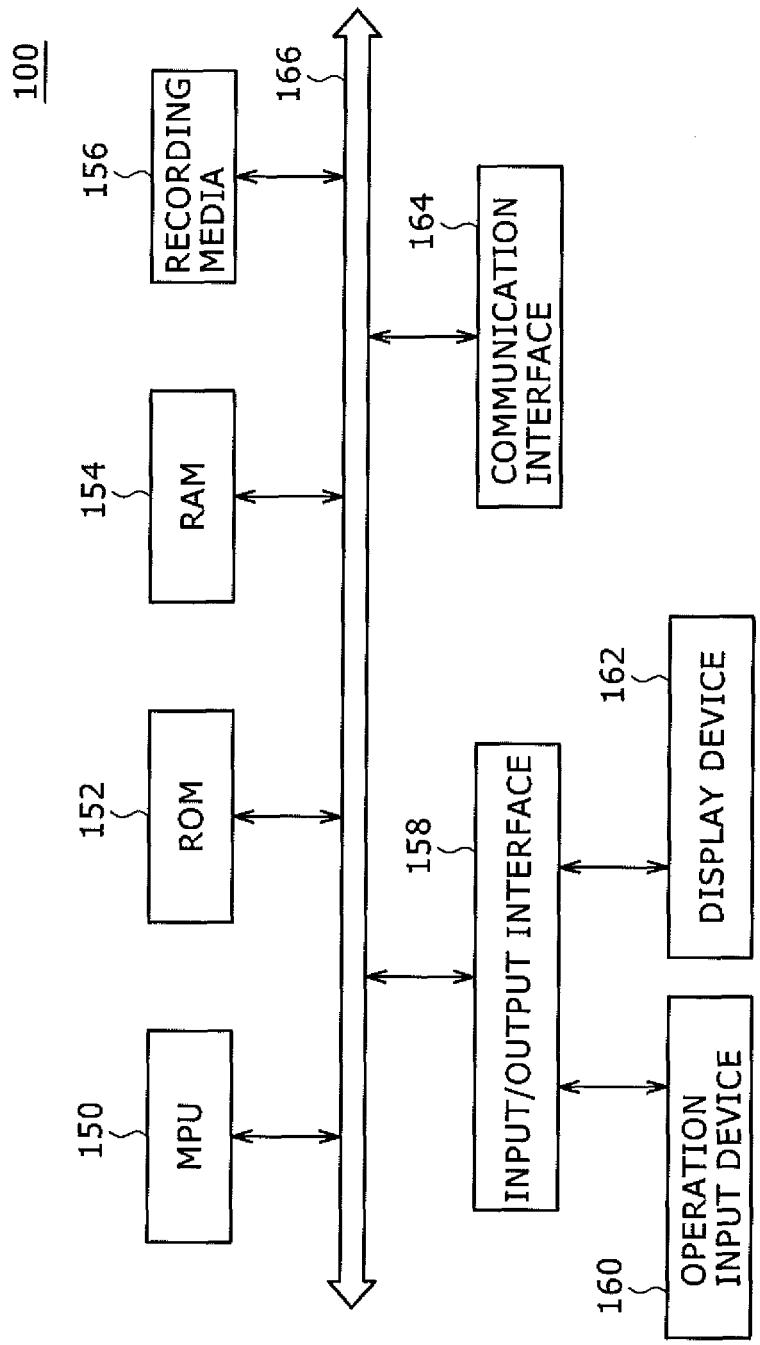
FIG. 9 is a schematic diagram illustrating an exemplary hardware configuration of the editing apparatus shown in FIG. 1.

Referring to FIG. 9, there is shown an exemplary hardware configuration of the editing apparatus 100 practiced as one embodiment of the disclosure. As shown in FIG. 9, the editing apparatus 100 has a MPU 150, a ROM 152, a RAM 154, a recording media 156, an input/output interface 158, an operation input device 160, a display device 162, and a communication interface 164, for example. The editing apparatus 100 interconnects the above-mentioned component devices by a bus 166 that provides a data transmission path, for example.

The MPU 150 is made up of an integrated circuit containing a MPU (Micro Processing Unit) and two or more circuits for realizing control functions and functions as the control unit 106 for controlling the entire editing apparatus 100. In addition, in the editing apparatus 100, the MPU 150 can function as a candidate image determination block 120, an image evaluation block 122, a story determination block 124, an evaluation value computation block 126, an image selection block 128, and an editing processing block 130 that will be described later.

The ROM 152 stores programs and control data such as operation parameters for use by the MPU 150. The RAM 154 temporarily stores programs to be executed by the MPU 150, for example.

The recording media 156 functions as the storage unit 102 and stores image evaluation information with image feature values as shown in FIG. 2 recorded and applications, for example. The recording media 156 is made up of a magnetic recording media such as an HDD (Hard Disk Drive) or a nonvolatile memory such as EEPROM (Electrically Erasable and Programmable Read Only Memory), a flash memory, a MRAM (Magnetoresistive Random Access Memory), FeRAM (Ferroelectric Random Access Memory), or PRAM (Phase change Random Access Memory), for example. The editing apparatus 100 can have the recording media 156 that is detachable from the editing apparatus 100.

The input/output interface 158 is connected to the operation input device 160 and the display device 162, for example. The operation input device 160 functions as the operator block 108. The display device 162 functions as the display block 110. The input/output interface 158 is made up of a USB (Universal Serial Bus) terminal, a DVI (Digital Visual Interface) terminal, an HDMI (High Definition Multimedia Interface) terminal, or any one of various processing circuits, for example. The operation input device 160 is arranged on the editing apparatus 100 and is connected to the input/output interface 158 inside the editing apparatus 100, for example. The operation input device 160 is made up of buttons, direction keys, or a rotary selector such as a jog dial, or a combination thereof, for example. The display device 162 is arranged on the editing apparatus 100 and is connected to the input/output interface 158 inside the editing apparatus 100, for example. The display device 162 is made up of an LCD (Liquid Crystal Display), an organic EL (Electroluminescence) display, or an OLED (Organic Light Emitting Diode) display, for example. It should be noted that the input/output interface 158 can be connected to an operation input device (a keyboard or a mouse, for example) and a display device (an external display for example) that is external to the editing apparatus 100. In addition, the display device 162 may be a device that allows both display and user operation, such as a touch display screen, for example.

The communication interface 164 is communication means arranged on the editing apparatus 100 and functions as the communication block 104 that executes communication with an external device such as a server via a network (or directly) in a wired or wireless manner. The communication interface 164 is made up of a communication antenna and an RF circuit (in wireless communication), an IEEE 802.15.1 port and a transmission/reception circuit (in wireless communication), IEEE802.11b port and a transmission/reception circuit (in wireless communication), or a LAN terminal and a transmission/reception circuit (in wired communication), for example. A network practiced as one embodiment of the disclosure is made up of a wired network such as LAN (Local Area Network) or a WAN (Wide Area Network), a wireless network such as wireless WAN (WWAN: Wireless Wide Area Network) via a base station, or the Internet based on communication protocols such as TCP/IP (Transmission Control Protocol/Internet Protocol), for example.

The editing apparatus 100 executes the editing approach practiced as one embodiment of the disclosure on the basis of the configuration shown in FIG. 9, for example. It should be noted that the hardware configuration of the editing apparatus 100 practiced as one embodiment of the disclosure is not limited to the example shown in FIG. 9. For example, the editing apparatus 100 may have an audio output device based on a DSP (Digital Signal Processor), amplifier, and a loudspeaker. In this case, the editing apparatus 100 can give audible error notification by outputting error sound from the above-mentioned audio output device in step S208 shown in FIG. 3, for example. Further, the editing apparatus 100 may be configured without the operation input device 160 and the display device 162 shown in FIG. 9, for example.

The following describes the configuration of the editing apparatus 100 practiced as one embodiment of the disclosure with reference to FIG. 8 again. The storage unit 102 is storage means arranged on the editing apparatus 100. The storage unit 102 is made up of a magnetic recording media such as a hard disk drive or a nonvolatile memory such as a flash memory, for example.

The storage unit 102 stores image data, story information, image evaluation information, and applications, for example. FIG. 8 shows an example in which image data 140 and so on, story information 142, and image evaluation information 144 are stored in the storage unit 102, for example.

The communication block 104 is communication means arranged on the editing apparatus 100 and executes communication with an external apparatus such as a server via a network (or directly) in a wired or wireless manner. The communication block 104 is controlled in communication processing by the control unit 106, for example.

The communication block 104 is made up of a communication antenna and an RF circuit or a LAN terminal and a transmission/reception circuit, for example. The configuration of the communication block 104 is not limited to the example described above. For example, the communication block 104 may be configured in any manner communicable with an external apparatuses via a network.

The control unit 106 is made up of an MPU or an integrated circuit in which two or more circuits are integrated to realize control functions and works to control the entire editing apparatus 100. The control unit 106 has the candidate image determination block 120, image evaluation block 122, the story determination block 124, the evaluation value computation block 126, the image selection block 128, and the editing processing block 130, thereby playing a leading role in executing the processing associated with the editing approach practiced as one embodiment of the disclosure. In addition, the control unit 106 may have a communication control block (not shown) configured to control communication with an external apparatus such as a server, for example.

The candidate image determination block 120 determines a candidate image on the basis of a user operation. To be more specific, the candidate image determination block 120 plays a leading role in executing the processing of step S100 shown in FIG. 1, for example.

The image evaluation block 122 sets a feature value for a candidate image on the basis of this candidate image. To be more specific, every time a candidate image is determined by the candidate image determination block 120, the image evaluation block 122 sets a feature value for each determined candidate image by executing image analysis on the determined candidate image and reference to the metadata thereof, for example. Next, the image evaluation block 122 generates image evaluation information and records the generated image evaluation information to the storage unit 102, for example. It should be noted that, if image evaluation information is recorded to the storage unit 102 in advance, the recorded image evaluation information may be updated in an overwrite manner or newly obtained image evaluation information may be recorded separately. The processing to be executed by the image evaluation block 122 is not limited to the example described above. For example, the image evaluation block 122 may set a feature value to the image data stored in the storage unit 102 without the determination of candidate images by the candidate image determination block 120.

If a candidate image is a moving image exceeding a predetermined duration of time in reproduction for example, then the image evaluation block 122 divides the candidate image such that the reproduction time falls within the predetermined duration of time and sets a feature value to each divided candidate image.

The story determination block 124 determines a story. To be more specific, the story determination block 124 plays a leading role in executing the processing of step S102 shown in FIG. 1, for example.

The evaluation value computation block 126 computes, on the basis of a story determined by the story determination block 124 and a feature value set to each of two or more candidate images, an evaluation value for each candidate image at each selection time. To be more specific, the evaluation value computation block 126 plays a leading role in executing the processing of step S104 shown in FIG. 1 by use of a story determined by the story determination block 124 and image evaluation information 144 stored in the storage unit 102, for example.

The image selection block 128 selects a selection image from among candidate images at every selection time on the basis of an evaluation value obtained in the evaluation value computation block 126. To be more specific, the image selection block 128 plays a leading role in executing the processing of step S106 shown in FIG. 1, for example.

The editing processing block 130 links the selection images selected at each selection time by the image selection block 128 with each other in a time-dependent manner. Namely, the editing processing block 130 plays a leading role in executing the processing of step S108 shown in FIG. 1, for example.

The control unit 106 can play a leading role in executing the processing associated with the editing approach by having the candidate image determination block 120, the image evaluation block 122, the story determination block 124, the evaluation value computation block 126, the image selection block 128, and the editing processing block 130. It should be noted that the configuration of the control unit 106 is not limited to the configuration shown in FIG. 8.

The operator block 108 is operation means arranged on the editing apparatus 100 that can be operated by the user. Through the operator block 108, the editing apparatus 100 enables the operation by the user, thereby executing user-desired processing in response to operations done by the user through the operator block 108. The operator block 108 is made up of buttons, direction keys, or a rotary selector such as a jog dial, or a combination thereof, for example.

The display block 110 is display means arranged on the editing apparatus 100, displaying various types of information on a display screen. Screens displayed on the display screen of the display block 110 include an error screen for visually telling an error in step S208 shown in FIG. 3, a reproduction screen for displaying an image indicated by image data, and an operation screen for the user to make the editing apparatus 100 executed desired processing, for example. The display block 110 is made up of an LCD or an organic EL display, for example. It should be noted that the editing apparatus 100 can configure the display block 110 with a touch screen. If a touch screen is employed, the editing apparatus 100 functions as an operation display block enabling both user operation and display.

The editing apparatus 100 can realize the processing associated with the editing approach practiced as one embodiment of the disclosure as shown in FIG. 1 for example by the configuration shown in FIG. 8 for example. Therefore, by the configuration shown in FIG. 8 for example, the editing apparatus 100 can select the images corresponding to a story from among two or more candidate images and edit the selected images. It should be noted that the configuration of the editing apparatus 100 practiced as one embodiment of the disclosure is not limited to the configuration shown in FIG. 8.

As described above, the editing apparatus 100 practiced as one embodiment of the disclosure sequentially computes an evaluation value for each selection time on the basis of a story expressed by a time function and a feature value set to each candidate image and selects a candidate image having the minimum (or maximum) evaluation value at each selection time (namely, a candidate image having a higher evaluation) as a selection image for each selection time. Therefore, the editing apparatus 100 can prevent a situation in which no selection image is selected at each selection time, this situation possibly happening by executing automatic editing by use of related-art technologies or story templates. Consequently, by executing the processing shown in FIG. 1 for example, the editing apparatus 100 can select images corresponding to a story from among two or more candidate images for each selection time for image selection, thereby editing the selected images.

In addition, the editing apparatus 100 selects, as a selection image, a candidate image having a high evaluation value computed from among two or more candidate images, so that, if editing is executed on unspecified many candidate images, a selection image that is closer to the story can be selected. Consequently, if candidate images dynamically change as with the case where images of an image community site in which two or more users add or delete images as desired are processed as candidate images, for example, the editing apparatus 100 can select selection images closer to the story from among the candidate images.

Further, the editing apparatus 100 uses a story expressed by a time function, so that the editing apparatus 100 can extend or shorten a story in accordance with the setting of selection time, for example. Namely, by use of a story expressed by a time function, the editing apparatus 100 can extend or shorten a story more easily than the case where a story template is used in which it is difficult to extend or shorten a story unless the story template itself is changed. Therefore, by use of a story expressed by a time function, the editing apparatus 100 can edit images having higher versatility.

In the above description, the editing apparatus 100 is referenced as one embodiment of the present disclosure. However, the embodiments of the present disclosure are not limited thereto. For example, the embodiments of the present disclosure are applicable to a variety of apparatuses and devices such as computers including PCs and servers, display apparatuses such as television receivers, portable communication apparatuses such as mobile phones, audio/video reproducing apparatuses (or video/music reproducing apparatuses), and game machines, for example.

In addition, the embodiments of the disclosure are applicable to computer groups configuring a system (namely, an editing system) subject to the connection to a network, such as a cloud computing network, for example.

Program Practiced as One Embodiment of the Disclosure

By a program for making a computer function as the editing apparatus practiced as one embodiment of the disclosure (namely, a program for realizing the processing associated with the editing approach practiced as one embodiment of the present disclosure as shown in FIG. 1, FIG. 3, FIG. 4, and FIG. 7, for example), images corresponding to a story can be selected from among two or more candidate images for each selection time to edit the selected images.

Recording Media Recording the Program Practiced as One Embodiment of the Disclosure In the above description, a program (namely, a computer program) for making a computer function as a control apparatus practiced as one embodiment of the disclosure is used. However, the embodiments of the disclosure provide a recording media in which this program is recorded.

While preferred embodiments of the present disclosure have been described using specific terms, such description is for illustrative purpose only, and it is to be understood that changes and variations may be made without departing from the spirit or scope of the following claims.

For example, the editing apparatus 100 practiced as one embodiment of the disclosure can separately arrange (or realize in separate circuits for example) the candidate image determination block 120, the image evaluation block 122, the story determination block 124, the evaluation value computation block 126, the image selection block 128, and the editing processing block 130 shown in FIG. 8.

The above-mentioned configurations show the examples of the embodiments of the present disclosure and obviously belong to the technological scope thereof.

What is claimed is:

1. An editing apparatus comprising:
one or more processors operable to:
determine an expected value of a feature value of each of a first plurality of candidate images at each selection time, wherein said expected value is expressed as a function of time and provides a reference for selecting an image from among said first plurality of candidate images for each selection time;

compute an evaluation value for each of said first plurality of candidate images for each selection time based on said expected value of each of the plurality of candidate images for each selection time and at least one feature value indicative of a feature of each of said first plurality of candidate images;

select said image for each selection time from among said first plurality of candidate images based on said computed evaluation value for each selection time; and sequentially link images selected for each selection time with each other in a time-dependent manner.

2. The editing apparatus according to claim 1, wherein said evaluation value is a Manhattan distance based on said feature value of each of said first plurality of candidate images and said expected value of said feature value of each of said first plurality of candidate images for each selection time.

3. The editing apparatus according to claim 2, wherein said image selected for each selection time comprises a first image of the first plurality of candidate images having a minimum evaluation value at each selection time.

4. The editing apparatus according to claim 1, wherein said image for each selection time is selected from said first plurality of candidate images, wherein at least a previously selected image is excluded from said first plurality of candidate images.

5. The editing apparatus according to claim 1, wherein said one or more processors are further operable to set at least one feature value for each of said first plurality of candidate images on the basis of said first plurality of candidate images.

6. The editing apparatus according to claim 5, wherein said first plurality of candidate images is a moving image, wherein when a reproduction time of the moving image exceeds a predetermined reproduction time, said moving image is divided such that said reproduction time falls within said predetermined reproduction time, wherein said at least one feature value is set for each of a second plurality of candidate images resulted from the division.

7. The editing apparatus according to claim 1, wherein said one or more processors are further operable to determine each of said first plurality of candidate images in accordance with a user operation.

8. The editing apparatus according to claim 1, wherein said one or more processors are further operable to execute communication with an external apparatus, wherein said one or more processors receive a story information from said external apparatus, wherein a story is specified based on said received story information.

9. The editing apparatus according to claim 1, wherein said expected value is expressed by said function of time based on said at least one feature value indicative of a feature quantity of each of said first plurality of candidate images.

10. The editing apparatus according to claim 9, wherein said expected value is expressed by said function of time based on information indicative of categories of each of the first plurality of candidate images.

11. An editing method performed by a hardware processing unit comprising:

determining an expected value of a feature value of each of a first plurality of candidate images at each selection time, wherein said expected value is expressed as a function of time and provides a reference for selecting an image from among said first plurality of candidate images for each selection time;

computing an evaluation value for each of said first plurality of candidate images for each selection time based on said expected value of each of the plurality of candidate images for each selection time and at least one feature value indicative of a feature of each of said first plurality of candidate images;

selecting said image for each selection time from among said first plurality of candidate images on the basis of said computed evaluation value for each selection time; and sequentially linking images selected for each selection time with each other in a time-dependent manner.

12. The editing method according to claim 11, wherein said image for each selection time is selected from said first plurality of candidate images, wherein at least a previously selected image is excluded from said first plurality of candidate images.

13. The editing method according to claim 11, further comprising determining each of the first plurality of candidate images in accordance with a user operation.

14. A non-transitory computer-readable storage medium having stored thereon, a computer program having at least one code section for editing, the at least one code section being executable by a device for causing the device to perform steps comprising:

in an editing apparatus:

determining an expected value of a feature value of each of a first plurality of candidate images at each selection time, wherein said expected value is expressed as a function of time and provides a reference for selecting an image from among said first plurality of candidate images for each selection time;

computing an evaluation value for each of said first plurality of candidate images for each selection time based on said expected value of each of the plurality of candidate images for each selection time and at least one feature value indicative of a feature of each of said first plurality of candidate images;

selecting said image for each selection time from among said first plurality of candidate images on the basis of said computed evaluation value for each selection time; and sequentially linking images selected for each selection time with each other in a time-dependent manner.

15. The non-transitory computer-readable storage medium according to claim 14, wherein said image for each selection time is selected from said first plurality of candidate images, wherein at least a previously selected image is excluded from said first plurality of candidate images.

16. The editing method according to claim 14, further comprising determining each of said first plurality of candidate images in accordance with a user operation.

17. A non-transitory computer-readable storage medium having stored thereon, a computer program having at least one code section for editing, the at least one code section being executable by a device for causing the device to perform steps comprising:

in an editing apparatus:

determining an expected value of a feature value of each of a first plurality of candidate images at each selection time, wherein said expected value is expressed as a function of time and provides a reference for selecting an image from among said first plurality of candidate images for each selection time;

computing an evaluation value for each of said first plurality of candidate images for each selection time based on said expected value of each of the plurality of candidate images for each selection time and at least one feature value indicative of a feature of each of said first plurality of candidate images, wherein said evaluation value is a Manhattan distance;

selecting said image for each selection time from among said first plurality of candidate images on the basis of said computed evaluation value for each selection time; and sequentially linking images selected for each selection time with each other in a time-dependent manner.

18. The non-transitory computer-readable storage medium according to claim 17, wherein said image for each selection time is selected from said first plurality of candidate images, wherein at least a previously selected image is excluded from said first plurality of candidate images.

19. The non-transitory computer-readable storage medium according to claim 17, further comprising determining each of said first plurality of candidate images in accordance with a user operation.

* * * * *